(12) United States Patent
Clark

(10) Patent No.: US 10,104,355 B1
(45) Date of Patent: Oct. 16, 2018

(54) METHOD AND SYSTEM FOR SIMULATING A MOCK PRESS CONFERENCE FOR FANTASY SPORTS

(71) Applicant: Jeffrey L. Clark, Sacramento, CA (US)

(72) Inventor: Jeffrey L. Clark, Sacramento, CA (US)

(*) Notice: Subject to any disclaimer, the term of this patent is extended or adjusted under 35 U.S.C. 154(b) by 0 days.

(21) Appl. No.: 14/672,190

(22) Filed: Mar. 29, 2015

(51) Int. Cl.
*H04N 9/802* (2006.01)
*H04N 5/85* (2006.01)
*G11B 31/00* (2006.01)
*G11B 27/10* (2006.01)
*H04N 9/80* (2006.01)
*G11B 27/02* (2006.01)
*G11B 27/031* (2006.01)
*H04N 9/74* (2006.01)

(52) U.S. Cl.
CPC ............. *H04N 9/802* (2013.01); *G11B 27/02* (2013.01); *G11B 27/031* (2013.01); *G11B 27/105* (2013.01); *G11B 31/00* (2013.01); *H04N 5/85* (2013.01); *H04N 9/80* (2013.01); *H04N 9/74* (2013.01)

(58) Field of Classification Search
CPC ............ H04N 9/802; H04N 9/80; H04N 5/85; H04N 9/74; G11B 27/031; G11B 27/02; G11B 27/105; G11B 31/00
See application file for complete search history.

(56) References Cited

U.S. PATENT DOCUMENTS

| | | | | |
|---|---|---|---|---|
| 5,730,603 A | * | 3/1998 | Harless | ................. G09B 5/065 434/308 |
| 5,864,844 A | * | 1/1999 | James | ..................... G09B 5/06 434/167 |
| 7,351,150 B2 | | 4/2008 | Sanchez | |
| 7,458,093 B2 | | 11/2008 | Dukes et al. | |
| 8,548,611 B2 | | 10/2013 | Ahlstrom | |
| 8,702,504 B1 | * | 4/2014 | Hughes | ............... G06F 3/04842 463/29 |

(Continued)

FOREIGN PATENT DOCUMENTS

DE      10049939      4/2002

OTHER PUBLICATIONS

Hirsch, Sandra, et al., The reality of fantasy: uncovering information-seeking behaviors and needs in online fantasy sports, CHI 2012, May 5-10, 2012, Austin, Texas, USA, pp. 849-864.

*Primary Examiner* — Gelek W Topgyal
(74) *Attorney, Agent, or Firm* — Evergreen Valley Law Group; Kanika Radhakrishnan

(57) ABSTRACT

A computer-implemented method and system for simulating a mock press conference for fantasy sports. The method includes presenting a plurality of topics and corresponding questions to a user. The questions are pre-loaded and recorded by a reporter representing a media outlet. The method also includes allowing the user to select a topic and a question. Further, the method includes recording the user's response to the question within a pre-defined time period to develop a corresponding Mock Press Conference video. Furthermore, the method includes processing the Mock Press Conference video once the user successfully completes responding to the question. Moreover, the method includes synchronizing the Mock Press Conference video with the question for automatic playback to simulate a real-life press conference broadcast with media flashes.

24 Claims, 12 Drawing Sheets

(56) References Cited

U.S. PATENT DOCUMENTS

| | | | | |
|---|---|---|---|---|
| 8,782,140 B1* | 7/2014 | Green | | G06F 15/16 709/205 |
| 2005/0060175 A1* | 3/2005 | Farber | | G09B 7/02 705/321 |
| 2007/0113250 A1 | 5/2007 | Logan | | |
| 2009/0187514 A1* | 7/2009 | Hannan | | G06F 17/30654 706/11 |
| 2009/0245386 A1* | 10/2009 | Chen | | H04N 19/172 375/240.25 |
| 2010/0114791 A1* | 5/2010 | Gold | | G06Q 10/10 705/347 |
| 2010/0322589 A1* | 12/2010 | Henderson | | G11B 27/02 386/224 |
| 2011/0081142 A1* | 4/2011 | Tsai | | G03B 9/70 396/173 |
| 2011/0276507 A1* | 11/2011 | O'Malley | | G06Q 10/00 705/321 |
| 2012/0182384 A1* | 7/2012 | Anderson | | H04L 12/1827 348/14.09 |
| 2012/0221477 A1* | 8/2012 | Pande | | G06Q 10/10 705/321 |
| 2013/0226578 A1* | 8/2013 | Bolton | | G06Q 10/1053 704/235 |
| 2013/0342632 A1* | 12/2013 | Su | | H04N 21/4307 348/14.01 |
| 2014/0248031 A1* | 9/2014 | Griggs | | H04H 60/06 386/230 |
| 2014/0313351 A1* | 10/2014 | Zak | | H04N 1/00204 348/207.1 |
| 2015/0004571 A1* | 1/2015 | Ironside | | G09B 5/10 434/185 |
| 2015/0206446 A1* | 7/2015 | Gupta | | G09B 5/08 434/362 |
| 2015/0356512 A1* | 12/2015 | Bradley | | G06Q 10/1053 705/321 |

* cited by examiner

METHOD AND SYSTEM FOR SIMULATING A MOCK PRESS CONFERENCE FOR FANTASY SPORTS

TECHNICAL FIELD

Embodiments of the disclosure relate generally to conferencing. Embodiments relate more particularly to a computer-implemented method and system for simulating a real-life mock press conference for fantasy sports.

BACKGROUND

With the growth of Internet in fantasy sports industry, new fantasy sports games have evolved. Specifically, press conferences have become predominant in the sports industry and are no longer subjected to present post game information. Moreover, press conferences are used to showcase new talent and portrait as a new forum to make fashion statements. Professional sports players are required to address the media at significant stages of matches. Basically, press conferences have become so predominant in sports that networks such as the NFL network, the NBA channel have created actual shows dedicated to team press conferences. Large flagships such as ESPN and Fox Sports have increased their coverage and broadcasts of events.

Currently, all fantasy sports leagues (such as, Yahoo, ESPN, CBS sports and NFL.com) utilize a "message board" that aids communication amongst team managers. However, the communication is limited and is aimed towards trash talk. Often, fans of sports personalities utilize Twitter to converse to receive information directly. However, fans experience the limitation of text characters. Moreover, the absence of visual presence leaves the fans dissatisfied with limited information.

In the light of the above discussion, there appears to be a need for users to experience a realistic situation of press conferences.

OBJECT OF INVENTION

The principal object of the embodiments herein is to allow viewers and users (people who create the video) of the press conference to experience the realistic situation of a franchise owner, a head coach or a star player at the podium by a simulated press conference accompanied with media camera flashes.

Another object of the embodiments herein is to provide ability for the user to respond to pre-loaded and recorded questions asked by created MEedia outlets.

Another object of the embodiments herein is to allow the users to choose questions to answer and take time to construct a well-though response.

SUMMARY

The above-mentioned needs are met by a computer-implemented method and system for simulating a mock press conference for fantasy sports.

A computer-implemented method and system for simulating a mock press conference for fantasy sports. The computer-implemented method includes presenting a plurality of topics and corresponding questions to a user. The questions are pre-loaded and recorded by a reporter representing a media outlet. The computer-implemented method also includes allowing the user to select a topic and a question. Further, the computer-implemented method includes recording the user's response to the question within a pre-defined time period to develop a corresponding Mock Press Conference video. Furthermore, the computer-implemented method includes processing the Mock Press Conference video once the user successfully completes responding to the question. Moreover, the computer-implemented method includes synchronizing the Mock Press Conference video with the question for automatic playback to simulate a real-life press conference broadcast with media flashes.

A computer program product stored on a non-transitory computer readable medium that when executed by a processor performs a method for simulating a mock press conference for fantasy sports. The computer program product includes presenting a plurality of topics and corresponding questions to a user. The questions are pre-loaded and recorded by a reporter representing a media outlet. The computer program product also includes allowing the user to select a topic and a question. Further, the computer program product includes recording the user's response to the question within a pre-defined time period to develop a corresponding Mock Press Conference video. Furthermore, the computer program product includes processing the Mock Press Conference video once the user successfully completes responding to the question. Moreover, the computer program product includes synchronizing the Mock Press Conference video with the question for automatic playback to simulate a real-life press conference broadcast with media flashes.

An example of a system for simulating a mock press conference for fantasy sports include a computing device and a user interface configured within the computing device to display a simulated real-time live press conference for fantasy sports. Further, the system includes a processor coupled within the computing device and configured to perform a plurality of operations. The operations include presenting a plurality of topics and corresponding pre-loaded and recorded questions to a user, wherein the questions are pre-loaded and recorded by a reporter representing a media outlet, allowing the user to select a topic and a question, recording the user's response to the question within a pre-defined time period to develop a corresponding Mock Press Conference video, processing the Mock Press Conference video once the user successfully completes the responding to the question and synchronizing the Mock Press Conference video with the question for automatic playback to simulate a real-life press conference broadcast.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a computer-implemented method and system for simulating a mock press conference for fantasy sports. The following detailed description is intended to provide example implementations to one of ordinary skill in the art, and is not intended to limit the invention to the explicit disclosure, as one or ordinary skill in the art will understand that variations can be substituted that are within the scope of the invention as described.

The computer-implemented method described herein is developed to be used within a fantasy sports industry. In some embodiments, the computer-implemented method may be further used for other industries. In a specific embodiment, the computer-implemented method described herein is further developed to be used in social media and video platforms.

It will be appreciated to those skilled in the art that the press conference may also refer to any press conference created digitally (with an online atmosphere).

System Block Diagram

Figure 1:
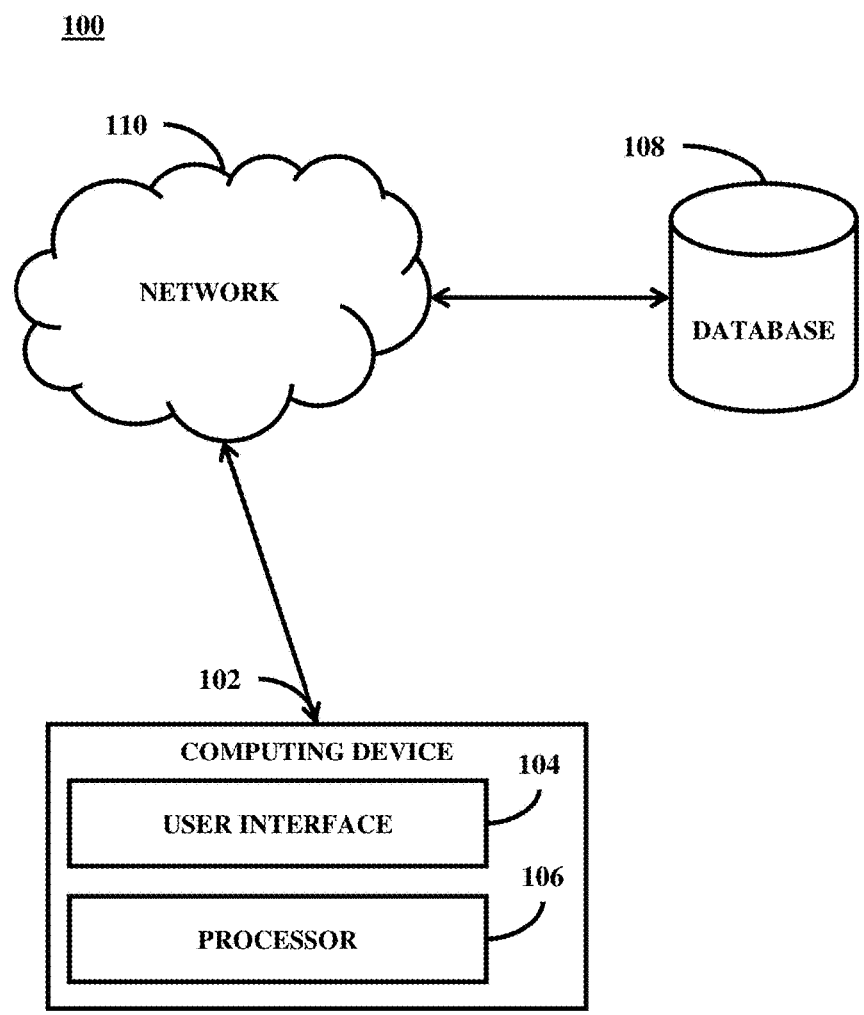
FIG. 1 is a block diagram of the environment, according to the embodiments as disclosed herein.

FIG. 1 is a block diagram of the environment 100, according to the embodiments as disclosed herein. The environment 100 includes a computing device 102 and a database 108 connected across a network 110. Further, the computing device 102 includes a user interface 104 and a processor 106.

Typically, the computing device 102 is a portable electronic device configured with a user interface 104 to interact with a user of the computing device 102. Examples of the computing device 102 include, but are not limited to, a personal computer (PC), laptops, a mobile phone, an iPad, a tablet device, a personal digital assistant (PDA), a smart phone and a laptop. Examples of the user interface 104 include, but are not limited to, display screen, keyboard, mouse, light pen, appearance of a desktop, illuminated characters and help messages.

The network 108, for example, the Internet, allows computing device 102 to connect to social networking websites that allow video-sharing (such as Facebook® and YouTube).

The processor 106 is configured with a non-transitory computer-readable medium (application herein referred to as "MEedia"), the contents of which causes the client device 102 to perform the method disclosed herein. Typically, the MEedia application is developed to be used for fantasy sports. However, the MEedia application can also be used for all news topic or conservation topics.

The method described herein allows viewers to experience a realistic situation of a user (for example a sports personality, a franchise owner, a head coach and a star player). Typically, the realistic situation captures a podium through a simulated press conference accompanied with media camera flashes. The method described herein, provides the user an ability to respond to questions asked by media outlets. Media outlets are publications or broadcast programs that provide news and feature stories to the public through various distribution channels. Examples of media outlets include, but are not limited to, newspapers, magazines, radio, television and the Internet.

A user of the computing device 102 selects the MEedia application displayed on the user interface 104. Examples of the user include, but are not limited to, sports personalities, favorite celebrities, athletes, politicians, family and friends. Subsequently, the MEedia application opens and a main page is displayed to the user. The main page resembles the podium of a simulated press conference. Further, the main page allows the user to select a desired function from a list of options. The list of options includes, create a new Mock Press Conference (MPC), view existing MPC's and create user profile. The user selects a desired option and a list of questions is presented by a reporter of a media outlet. The user can select a question to answer and click on a start button displayed on the screen. A sequence of instruction prompts are displayed to prepare the user to respond. Upon responding, the video (now referred to as MPC video) is saved and synchronized with the question. The MPC video is automatically played back and displayed with a list of existing MPC videos The user may now email the MPC video to other users. Alternatively, the user may upload or share the MPC video with other video-sharing websites.

It should be appreciated by those of ordinary skill in the art that FIG. 1 depicts the computing device 102 in an over simplified manner, and a practical embodiment may include additional components and suitably configured processing logic to support known or conventional operating features that are not described in detail herein.

Operational Flow Chart

Figure 2:
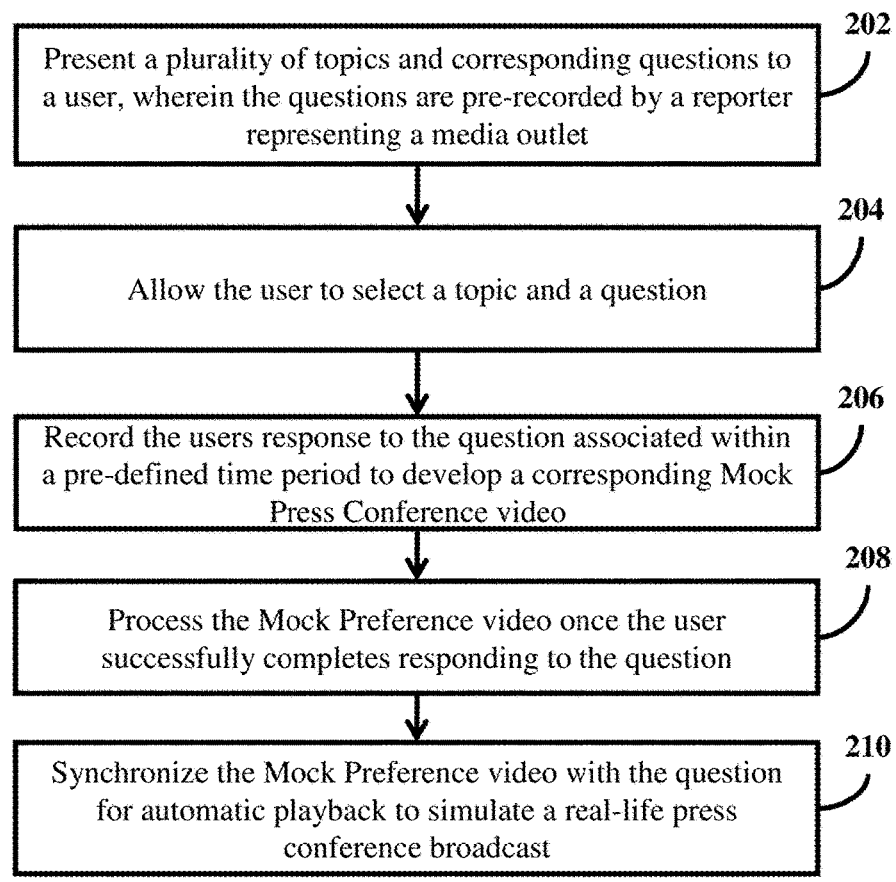
FIG. 2 is a flow chart describing a method for providing a simulated mock press conference for fantasy sports, according to the embodiments as disclosed herein.

FIG. 2 is a flow chart describing a method for providing a simulated mock press conference for fantasy sports, according to the embodiments as disclosed herein. The flow chart begins at step 202.

An icon of the MEedia application is displayed to the user using the computing device 102 as described in FIG. 1. The user selects the icon and a main menu is displayed. The main menu displays a list of options for the user to select. The options include the following:

a. Create new MPC: Allows the user to create a new MPC by choosing a question to answer and subsequently record the user's response.

b. View Existing MPC: Displays a list of existing MPC's to the user. The user may select a desired MPC to be played.

c. Profiles: Allows the user to create a profile by entering a plurality of information. The information includes, name as a player, team name, position and league that is currently being played. The user is allowed to select a desired sport to converse, for example a fantasy Baseball league or a fantasy Soccer League. Further, the user is permitted to select "logo" on the page. Upon selecting the "logo" icon, a corresponding logo can be placed next to the text bar.

The user selects the option of "Create new MPC" displayed on the main page of the MEedia application.

The MPC begins to be set up. The background is driven by the logo that the user uploads. In some embodiments, unwanted background behind a user's body is removed and replaced with a video or a still image. A text bar with all information (such as name, team name, user's position, league game and topic of conversation) is displayed at the bottom of the page.

At step 202, a plurality of topics and corresponding questions are presented to the user. The questions are pre-recorded by a reporter representing a media outlet.

Basically, the topic includes the following:
a. Discuss a Win
b. Discuss a Loss
c. Discuss an Injury
d. Just Rant In some embodiments, the recorded questions can be presented by any individual.

At step 204, the user is allowed to select a topic and a corresponding question. Subsequently, a plurality of questions (for example, three at a time) is displayed to the user. The selected question is played and a sequence of instruction prompts is displayed to prepare the user to begin answering.

At step 206, the user's response to the question is recorded to develop a Mock Press Conference video. A timer begins to count down for a pre-defined time period. The timer notifies the user of the time remaining.

At step 208, the MPC video is processed once the user successfully completes responding to the question. The MPC video is saved in a database.

At step 210, the MPC video is synchronized with the recorded question for playback to simulate a real-life press conference broadcast with media flashes.

The method ends at step 210.

The MEedia application allows the user to choose the questions to answer and take time to construct a well-thought response. Further, the MEedia application also allows the user to respond to negative press or false reports that have been broadcasted or publicly disseminated by the national media.

Operational Flow Chart

Figure 3A:
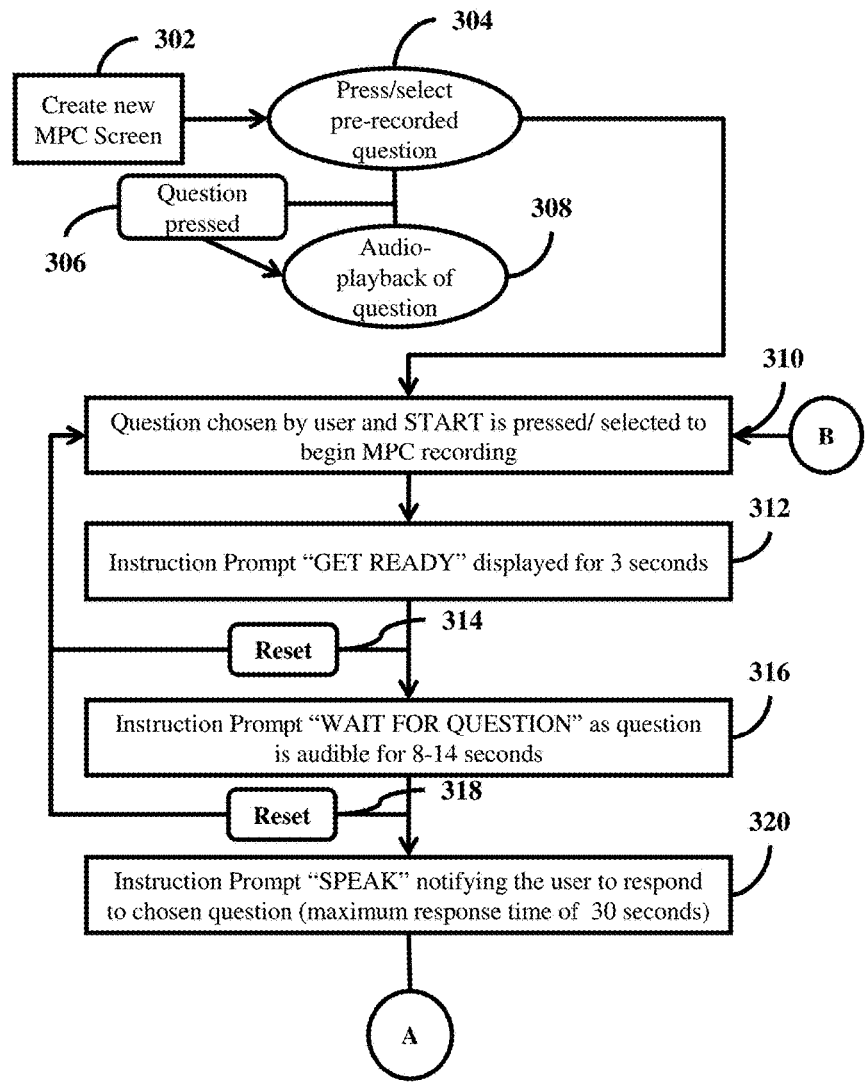
FIG. 3a and FIG. 3b is a flow chart describing a method for question and answer recording, according to the embodiments as disclosed herein.
Figure 3B:
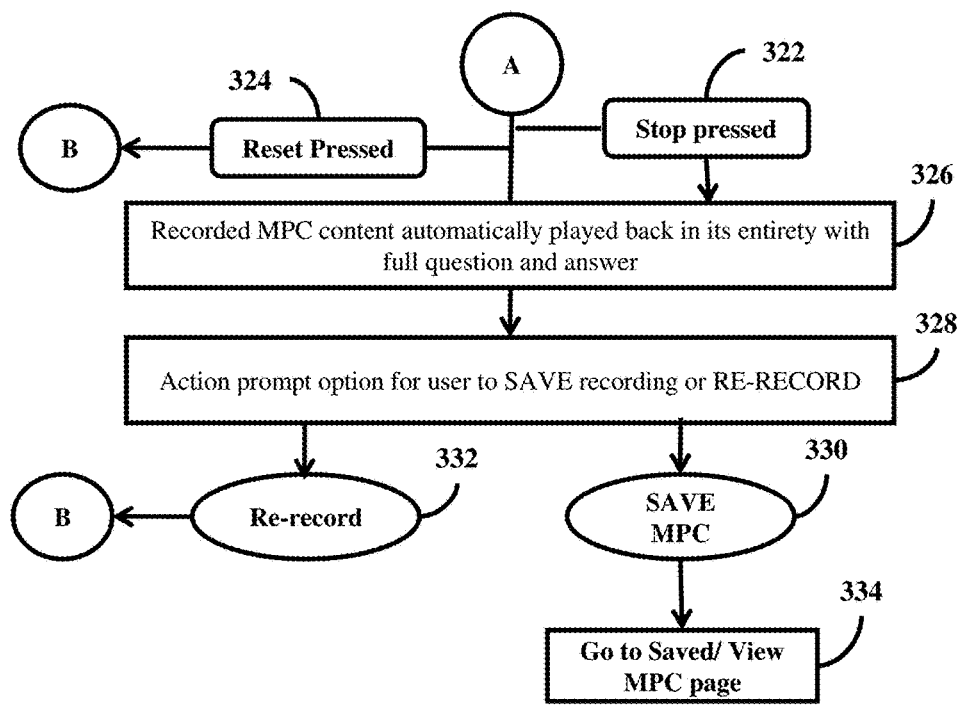

FIG. 3a and FIG. 3b is a flow chart describing a method for question and answer recording, according to the embodiments as disclosed herein. The flow chart begins at step 302.

At step 302, a new Mock Preference Conference (MPC) screen is created.

At step 304, a pre-loaded and recorded question is selected.

At step 306, the question is pressed.

At step 308, the question is audio playback simultaneously.

At step 310, the question chosen by the user and "START" is pressed to begin MPC recording.

At step 312, "GET READY" instruction prompt is displayed for 3 seconds.

At step 314, the user may want to reset and subsequently step 310 is performed.

At step 316, "WAIT FOR QUESTION" instruction prompt is displayed, as the question is audible for 8-14 seconds.

At step 318, the user may want to reset and subsequently step 310 is performed.

At step 320, "SPEAK" instruction prompt is displayed to notify the user to respond to the chosen question.

At step 322, the method can be stopped and subsequently step 326 is performed.

At step 324, the method can be reset and subsequently step 310 is performed.

At step 326, the recorded MPC content is automatically played back in its entirety with full question and answer.

At step 328, an action prompt option is displayed to the user to "SAVE" the recording or "RE-RECORD" the video.

At step 330, the MPC is saved.

At step 332, the MPC is re-recorded and step 310 is performed.

At step 334, the MPC page is saved and viewed. A message is displayed on successful process of saving the MPC. A list of MPC's is displayed to the user including the MPC just recorded.

Further, the user is provided with an option to either stay and record another MPC or go to the main menu and view or share the recorded MPC. The MPC video may be emailed, uploaded or shared with any video-sharing website, such as Facebook® and YouTube. Further, the MPC video can be sent to another user's account thereby enabling direct communication between users of the MEedia application. Additionally, the MEedia application allows any individual to provide questions to other users.

Furthermore, the user is also provided with an option to cut/edit the MPC by hitting the stop button displayed on the MPC screen.

The flow chart ends at step 334.

Exemplary Snapshots

FIG. 4a, FIG. 4b, FIG. 4c, FIG. 4d, FIG. 4e, FIG. 4f and FIG. 4g are exemplary snapshots of the simulated mock press conference, according to the embodiments as disclosed herein.

Figure 4A:
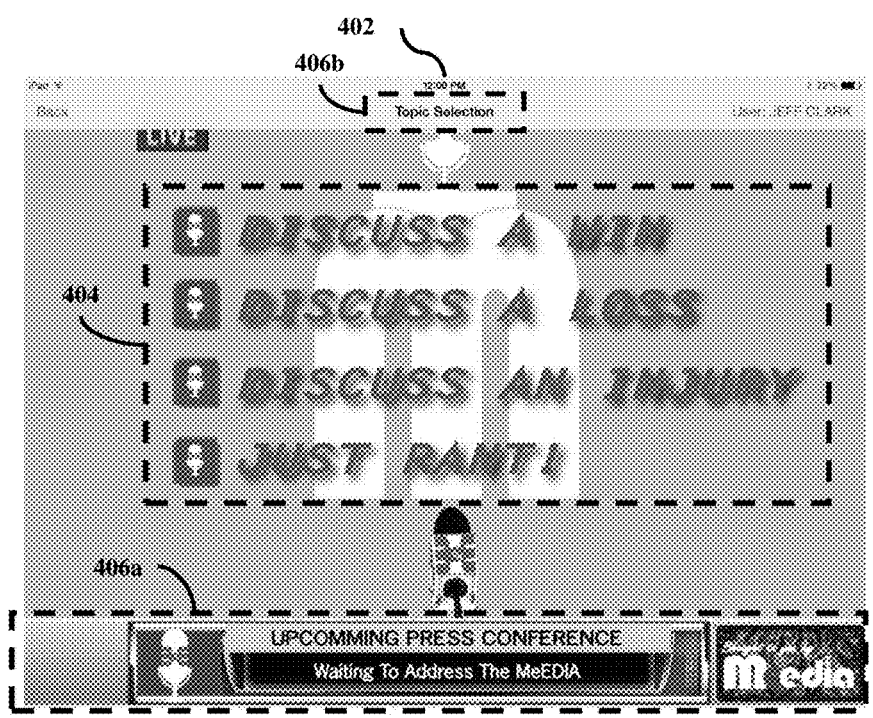
FIG. 4a, FIG. 4b, FIG. 4c, FIG. 4d, FIG. 4e, FIG. 4f and FIG. 4g are exemplary snapshots of the simulated mock press conference, according to the embodiments as disclosed herein.

FIG. 4a illustrates an exemplary snapshot of a mock press conference screen 402. The mock press conference screen 402 displays a list of topics 404 to a user. The list of topics 404 includes "Discuss a win", "Discuss a loss", "Discuss an injury" and "just rant". Further, the mock press conference screen 402 includes a plurality of status message bar 406a and 406b information entered by the user.

Figure 4B:
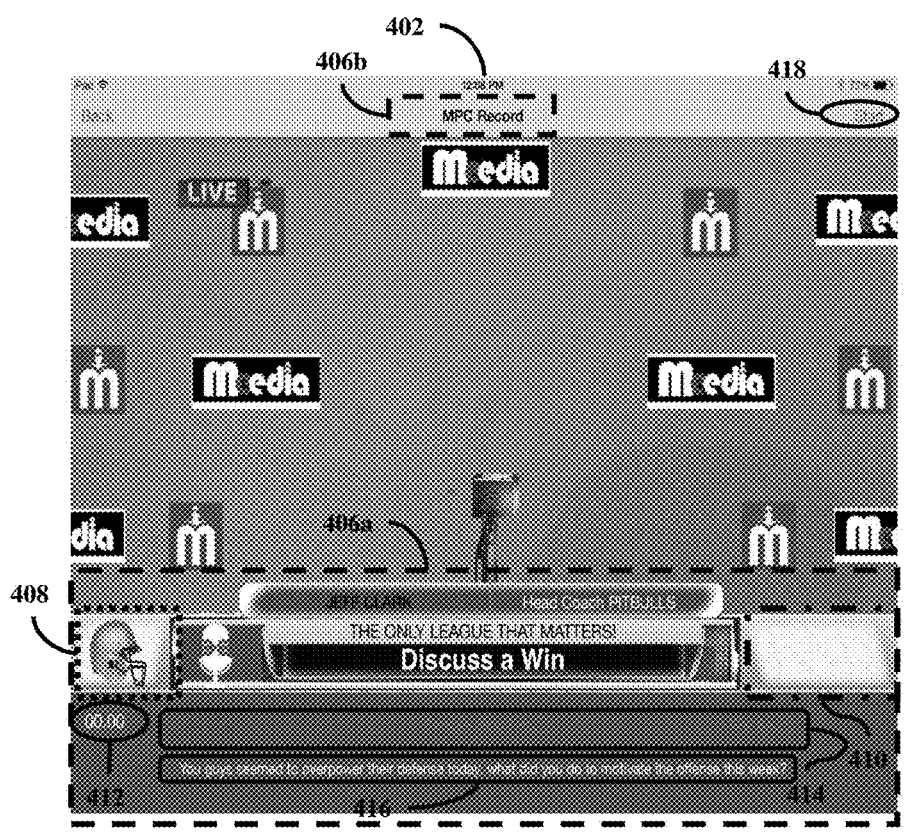

FIG. 4b illustrates an exemplary snapshot of the mock press conference screen 402 ready for MPC recording 406b. Further, as described in FIG. 4a, the status message bar 406a signifies that the topic "Discuss a win" that has been selected. Furthermore, the user can upload a corresponding logo in the logo box 408 positioned towards the right hand side of the screen. Additionally, towards the left hand side of the screen, a video area 410 is provided to run the video during the playback of the MPC video. Typically, the video area 410 is associated with advertisers to facilitate streaming of advertisements/commercials simultaneously as the video is played back.

A timer 412 is also displayed on the status message bar 406. The timer is generally a countdown to the MPC session. Further, a set of questions 414 is randomly displayed to the user. Typically, three questions at a time are presented to the user. The user can now select a media outlet and hear the question by clicking. Correspondingly, the question is also scripted out in text 416 to the user. Upon selecting the question, the user hits on the start button 418 to begin recording the MPC.

Figure 4C:
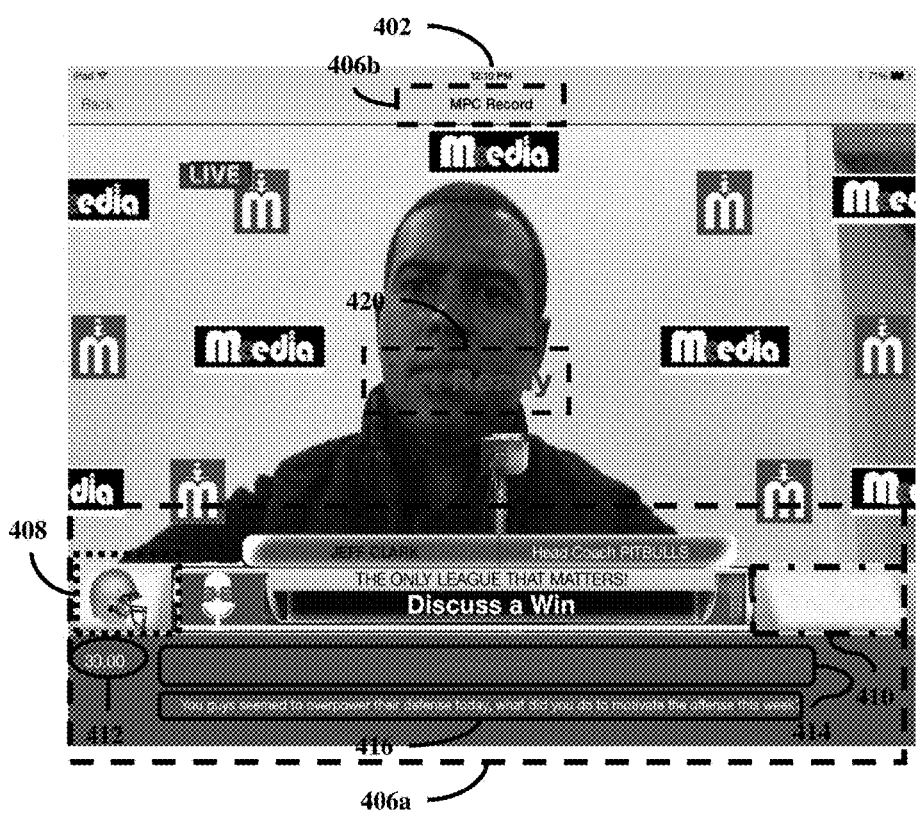

FIG. 4c illustrates an exemplary snapshot of the mock press conference screen 402 displaying an instruction prompt 420 to the user. The instruction prompt 420 notifies the user to "Get Ready" to answer the pre-loaded question.

Figure 4D:
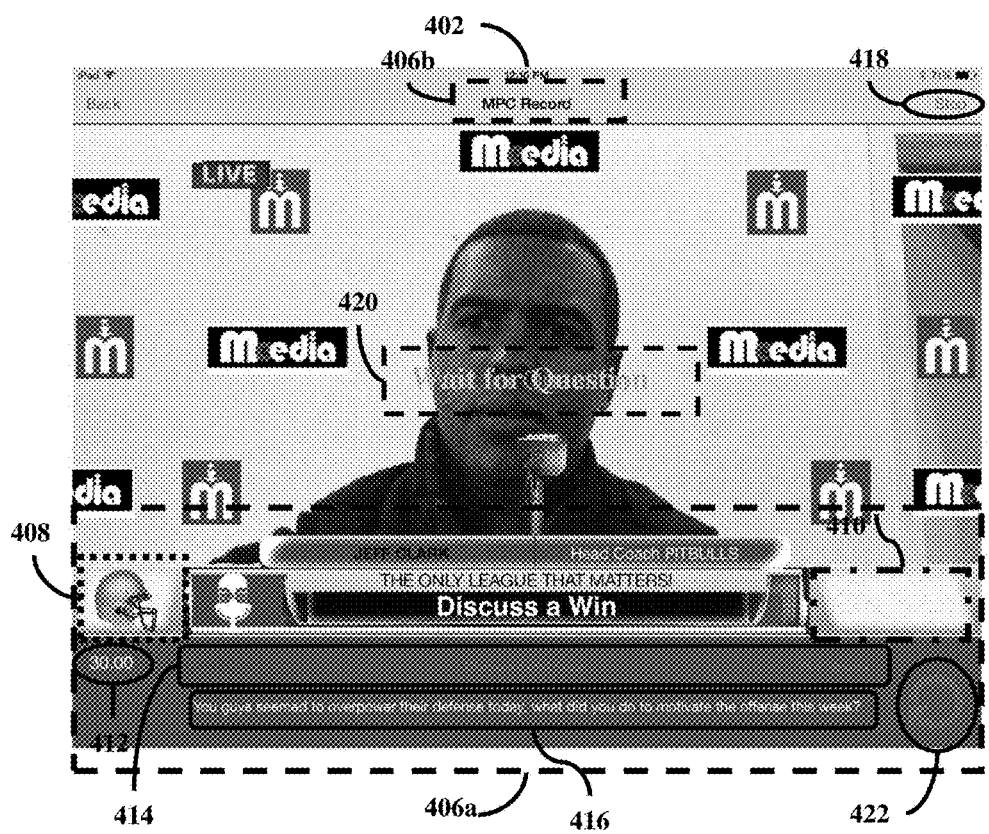

FIG. 4d illustrates an exemplary snapshot of the mock press conference screen 402 displaying the instruction prompt 420 to the user. The instruction prompt 420 notifies the user to "Wait for Question" as the recorded question is loaded and simultaneously played back for the user to hear.

The user is allowed to refresh/restart the process of the choosing a question by clicking on a refresh button 422.

Figure 4E:
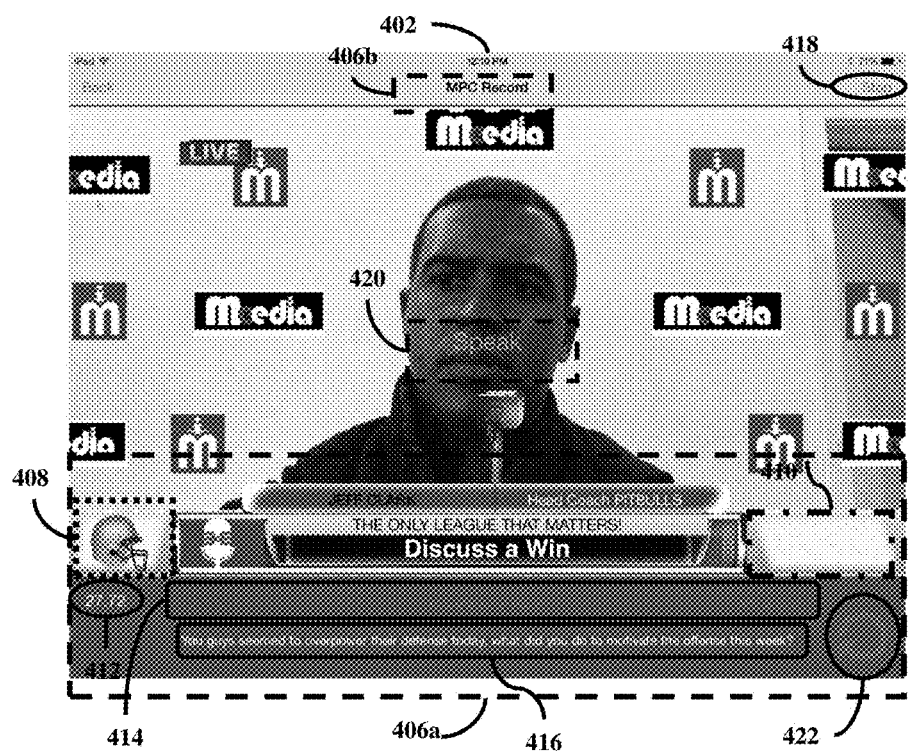

FIG. 4e illustrates an exemplary snapshot of the mock press conference screen 402 displaying the instruction prompt 420 to the user. The instruction prompt 420 notifies the user to "Speak" while the response is recorded. At this moment, constant media camera flashes are hit while the user answers the pre-loaded and recorded question thereby simulating a real-life press conference. Further, the timer begins to count down for 30 seconds.

Figure 4F:
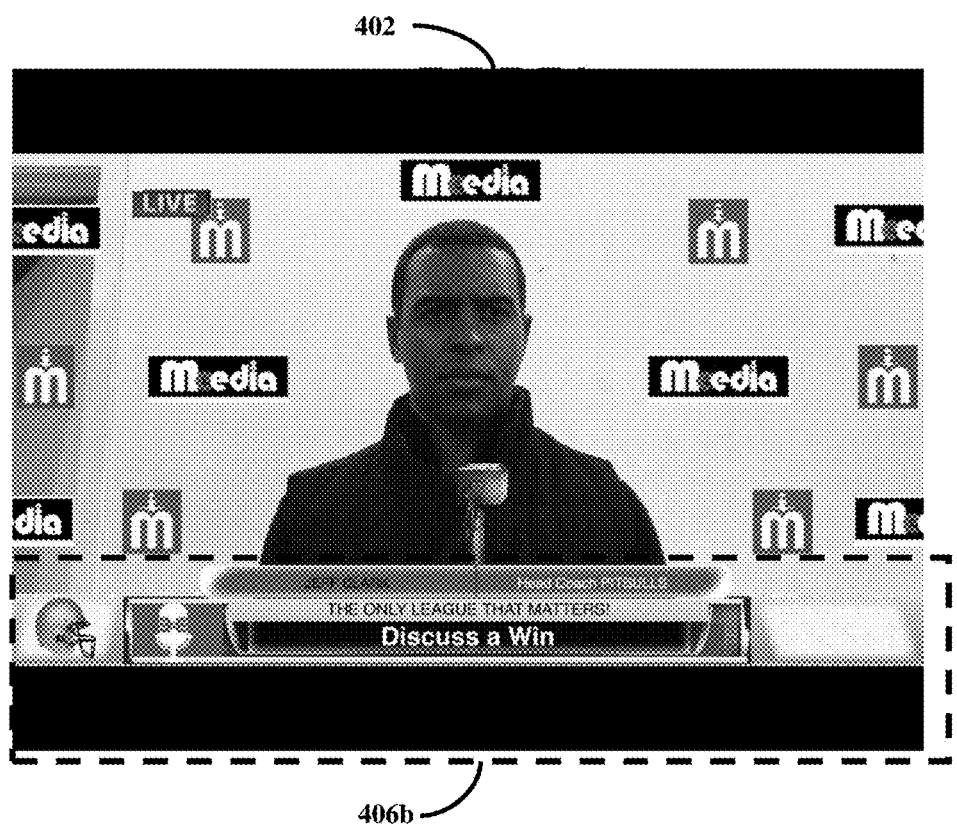

FIG. 4f illustrates an exemplary snapshot of the mock press conference screen 402 presenting the recorded question and the user's response.

Figure 4G:
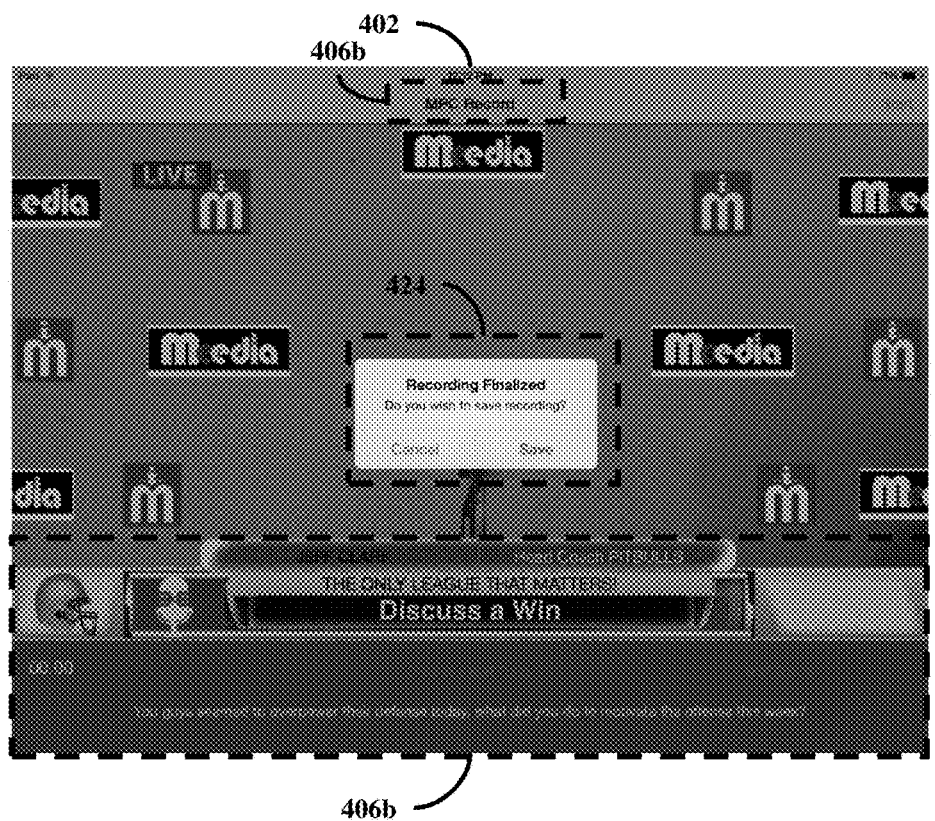

FIG. 4g illustrates an exemplary snapshot of the mock press conference screen 402 displaying a message 424 to the user. Once the user responds to the question, the MPC is paused and subsequently processed for a few seconds. Consequently, the pre-loaded and recorded question and the user's response are automatically played back. The message 424 is displayed to provide an option for saving the response. If the response is satisfactory to the user, the save button is clicked. Saving the response takes some time (for example 15 to 30 seconds) to process and subsequently stored for playback purposes with other saved MPC's.

In some embodiments, the method described herein can be implemented in game system platforms (such as PlayStation 4 and XBOX) along with digital press conference. MEedia application can be specifically utilized in several game titles such as Madden football that simulates NFL football. Further, in such a scenario, players of the game play against known and unknown competitors, through the Play station and Microsoft XBOX live online networks. MEedia application can be used to reveal the players online presence with a digital press conference at the end of the game.

System Block Diagram

Figure 5:
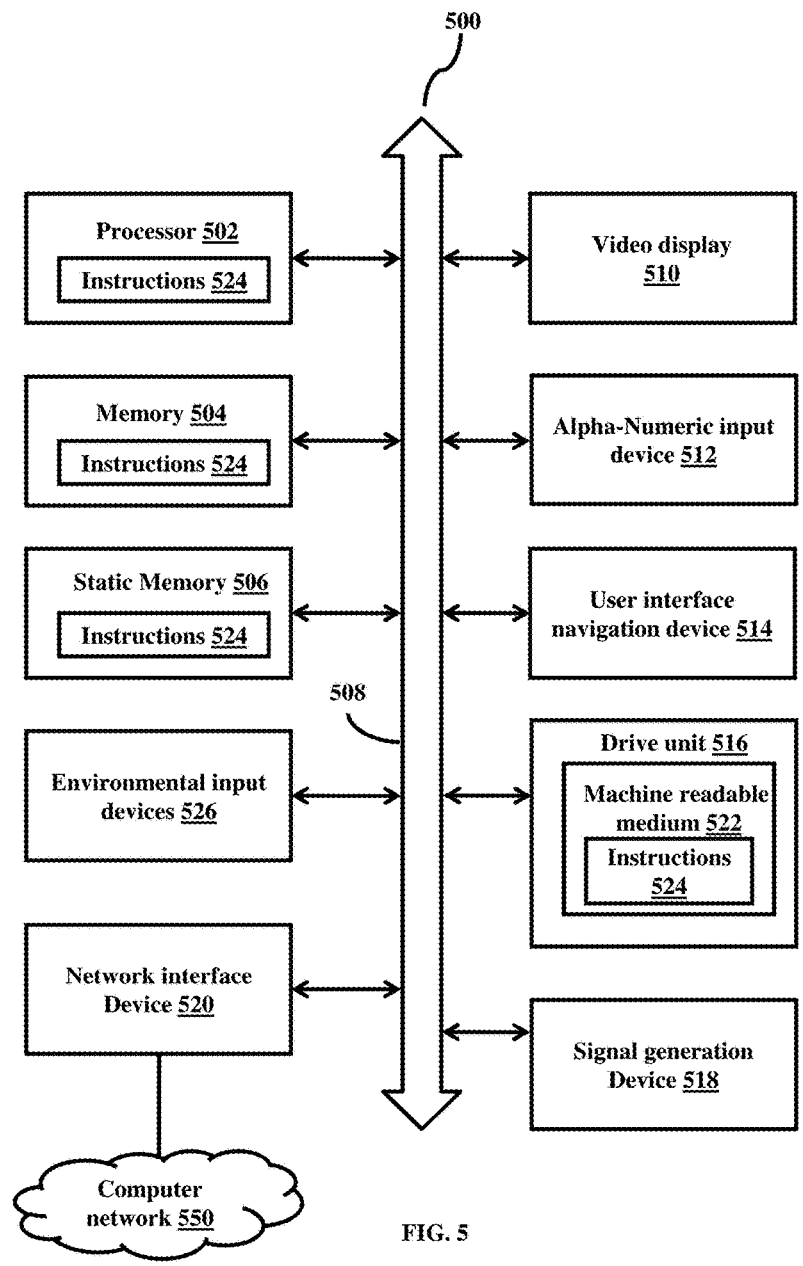
FIG. 5 is a block diagram of a machine in the example form of a computer system within which instructions for causing the machine to perform any one or more of the methodologies discussed herein may be executed.

FIG. 5 is a block diagram of a machine in the example form of a computer system within which instructions for causing the machine to perform any one or more of the methodologies discussed herein may be executed.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504, and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), and a network interface device 520. The computer system 500 may also include a environmental input device 526 that may provide a number of inputs describing the environment in which the computer system 500 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 524 may further be transmitted or received over a computer network 550 using a transmission medium. The instructions 524 may be transmitted using the network interface device 520 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method for simulating a mock press Conference (MPC), accompanied with podium and media flashes, for fantasy sports to enable a viewer to experience a realistic simulation of a press conference given by a user/interviewee and an interviewer, the computer-implemented method comprises:
   presenting a plurality of topics and corresponding questions to the user, wherein the questions are pre-loaded and recorded by a reporter representing a media outlet;
   allowing the user to select a topic and further allowing the user to select a question disseminated by the media to which the user desires to give a simulated response;
   displaying a MPC screen, the MPC screen comprising
      an area for displaying the topic,
      a separate area for displaying a logo,
      a video area, to left of the area for displaying the topic, for running a MPC video during playback of the MPC video and for facilitating streaming of advertisements simultaneously with the MPC video when the MPC video is played back,
      a timer for indicating countdown of a MPC session,
      a separate area for displaying a plurality of questions to the user,
      a separate area for scripting out text of the selected question, and
      a separate area for providing instruction prompts to the user,
   displaying an instruction prompt "Get Ready" to answer the question;
   displaying an instruction prompt "Wait for Question" as the question is loaded and simultaneously played back for the user to hear;
   displaying an instruction prompt "Speak" to notify the user to respond;
   recording the user's response to the question within a pre-defined time period defined by the timer;
   hitting media camera flashes while user's response is recorded to simulate real-life press conference;
   giving the user the option of recording another response to the question;
   processing the MPC video once the user successfully completes responding to the question;
   pausing the MPC video while the user's response is processed;
   synchronizing the MPC video with the question for automatic playback to simulate a real-life press conference broadcast with the media flashes; and
   promulgating the MPC video by one of (1) emailing the video to other users, (2) uploading and sharing the video with other video-sharing websites or mobile applications;
   whereby the user is able to respond to questions or reports disseminated by media outlets, while optimizing form and content of the answer to the question.

2. The computer-implemented method of claim 1 and further comprising:

displaying the selected question and simultaneously presenting the question through audio playback.

3. The computer-implemented method of claim 1 wherein recording the user's response further comprises:
   notifying the user to indicate the beginning of the recording session;
   notifying the user to get ready to hear the selected question;
   loading the selected question to be played and heard by the user similar to a reality press conference atmosphere where the user is being interviewed and accepts a question from the press;
   displaying a notification to wait while the question is played to the user, the notification indicates the time to respond to the question; and
   allowing the user to respond to the question by displaying a prompt to speak.

4. The computer-implemented method of claim 1 and further comprising:
   allowing the user to restart the process of answering the question in a scenario of dissatisfaction.

5. The computer-implemented method of claim 1 and further comprising:
   saving the MPC video and subsequently displaying a message to the user indicating successful operation; and
   displaying a list of recorded MPC videos to the user.

6. The computer-implemented method of claim 1 and further comprising:
   allowing the user to cut and edit the MPC video by clicking on a stop button displayed on the MPC screen.

7. The computer-implemented method of claim 1 and further comprising:
   allowing the user to restart the process of answering the question in a scenario of dissatisfaction.

8. The computer-implemented method of claim 1 and further comprising:
   saving the MPC video and subsequently displaying a message to the
user indicating successful operation; and
   displaying a list of recorded MPC videos to the user.

9. The computer-implemented method of claim 1 and further comprising:
   allowing the user to cut and edit the MPC video by clicking on a stop button displayed on the MPC screen.

10. The computer-implemented method of claim 1, wherein:
   presenting the plurality of topics and corresponding questions to the user includes a finite time duration while the plurality of topics and corresponding questions are called up for the presentation; and
   recording the user's response further comprises recording the user, as the user waits for the question to be called up for presentation to the user.

11. The computer-implemented method of claim 1, wherein:
   the plurality of topics and corresponding questions includes:
   (i) a question literally posed in a media outlet, and
   (ii) a question not literally posed in a media outlet, but derivable from a topic given in the media outlet.

12. The computer-implemented method of claim 1 and further comprising:
   setting a background of the MPC by uploading logo based on choice of the user.

13. The computer-implemented method of claim 12 wherein:
the background of the MPC is set by removing an old background and uploading logo.

14. A computer program product stored on a non-transitory computer readable medium that when executed by a processor, performs a method for simulating a mock press conference (MPC), accompanied with podium and media flashes, for fantasy sports to enable a viewer to experience a realistic simulation of a press conference given by a user/interviewee and an interviewer, comprising:
   presenting a plurality of topics and corresponding questions to the user, wherein the questions are pre-loaded and recorded by a reporter representing a media outlet;
   allowing the user to select a topic and further allowing the user to select a question from a plurality of questions, communicated by another user connected to the user on an application supporting the MPC, to which the user desires to give a simulated response;
   displaying a MPC screen, the MPC screen comprising
      an area for displaying the topic,
      a separate area for displaying a logo,
      a video area for running a MPC video during playback of the MPC video and for facilitating streaming of advertisements simultaneously with the MPC video when the MPC video is played back,
      a timer for indicating countdown of a MPC session,
      a separate area for displaying a plurality of questions to the user,
      a separate area for scripting out text of the selected question, and
      a separate area for providing instruction prompts to the user,
   displaying an instruction prompt "Get Ready" to answer the question;
   displaying an instruction prompt "Wait for Question" as the question is loaded and simultaneously played back for the user to hear;
   displaying an instruction prompt "Speak" to notify the user to respond;
   recording the user's response to the question within a pre-defined time period defined by the timer;
   hitting media camera flashes while user's response is recorded to simulate real-life press conference;
   giving the user the option of recording another response to the question;
   processing the MPC video once the user successfully completes responding to the question;
   pausing the MPC video while the user's response is processed;
   synchronizing the MPC video with the question for automatic playback to simulate a real-life press conference broadcast with the media flashes; and
   promulgating the MPC video by one of (1) emailing the video to other users, (2) uploading and sharing the video with other video-sharing websites or mobile applications;
   whereby the user is able to respond to questions or reports disseminated by media outlets, while optimizing form and content of the answer to the question.

15. The computer program product of claim 14 and further comprising:
   displaying the selected question and simultaneously presenting the question through audio playback.

16. The computer program product of claim 14 wherein recording the user's response further comprises:
   notifying the user to indicate the beginning of the recording session;

notifying the user to get ready to hear the selected question;

loading the selected question to be played and heard by the user similar to a reality press conference atmosphere where the user is being interviewed and accepts a question from the press;

displaying a notification to wait while the question is played to the user, the notification indicates the time to respond to the question; and allowing the user to respond to the question by displaying a prompt to speak.

17. The computer program product of claim 14, wherein:

presenting the plurality of topics and corresponding questions to the user includes a finite time duration while the plurality of topics and corresponding questions are called up for the presentation; and recording the user's response further comprises recording the user, as the user waits for the question to be called up for presentation to the user.

18. The computer program product of claim 14, wherein:

the plurality of topics and corresponding questions includes:

(i) a question literally posed in a media outlet, and (ii) a question not literally posed in a media outlet, but derivable from a topic given in the media outlet.

19. A system for simulating a mock press conference (MPC), accompanied with podium and media flashes, for fantasy sports to enable a viewer to experience a realistic simulation of a press conference given by a user/interviewee and an interviewer, the system comprising:

a computing device;

a user interface configured within the computing device to display a simulated real-time live press conference for fantasy sports; and a processor coupled within the computing device and configured to perform:

present a plurality of topics and corresponding questions to the user, wherein the questions are pre-loaded and recorded by a reporter representing a media outlet;

allow the user to select a topic and further allowing the user to select a question disseminated by the media to which the user desires to give a simulated response;

display a MPC screen, the MPC screen comprising an area for displaying the topic, a separate area for displaying a logo, a video area, adjacent to the area for displaying the topic, for running a MPC video during playback of the MPC video and for facilitating streaming of advertisements simultaneously with the MPC video when the MPC video is played back, a timer for indicating countdown of a MPC session, a separate area for displaying a plurality of questions to the user, a separate area for scripting out text of the selected question, and a separate area for providing instruction prompts to the user, display an instruction prompt "Get Ready" to answer the question;

display an instruction prompt "Wait for Question" as the question is loaded and simultaneously played back for the user to hear;

display an instruction prompt "Speak" to notify the user to respond;

record the user's response to the question within a pre-defined time period defined by the timer;

hit media camera flashes while user's response is recorded to simulate real-life press conference;

give the user the option of recording another response to the question;

process the MPC video once the user successfully completes responding to the question;

pause the MPC video while the user's response is processed;

synchronize the MPC video with the question for automatic playback to simulate a real-life press conference broadcast with the media flashes; and promulgate the MPC video by one of (1) emailing the video to other users, (2) uploading and sharing the video with other video-sharing websites or mobile applications;

whereby the user is able to respond to questions or reports disseminated by media outlets, while optimizing form and content of the answer to the question.

20. The system of claim 19 and further comprising:

a database to store the video and subsequently sharing with one or more websites or mobile applications and played back.

21. The system of claim 19 and further comprising:

a camera configured within the computing device to produce the media flashes as the MPC video is recording.

22. The system of claim 19, wherein:

presenting the plurality of topics and corresponding questions to the user includes a finite time duration while the plurality of topics and corresponding questions are called up for the presentation; and recording the user's response further comprises recording the user, as the user waits for the question to be called up for presentation to the user.

23. The system of claim 19, wherein:

the plurality of topics and corresponding questions includes:

(i) a question literally posed in a media outlet, and (ii) a question not literally posed in a media outlet, but derivable from a topic given in the media outlet.

24. The system of claim 19 and further comprising:

a text bar displaying information including team name, player, position of player, league game and topic of conversation.

* * * * *